(12) United States Patent
Kang et al.

(10) Patent No.: US 7,800,481 B2
(45) Date of Patent: Sep. 21, 2010

(54) RFID DEVICE HAVING A NONVOLATILE FERROELECTRIC MEMORY

(75) Inventors: Hee Bok Kang, Cheongju-si (KR); Jin Hong Ahn, Anyang-si (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 1110 days.

(21) Appl. No.: 11/482,029

(22) Filed: Jul. 7, 2006

(65) Prior Publication Data
US 2007/0132557 A1  Jun. 14, 2007

(30) Foreign Application Priority Data
Dec. 9, 2005  (KR)  .................. 10-2005-0120633

(51) Int. Cl.
  H04Q 5/22   (2006.01)
  G11C 7/10   (2006.01)
  G11C 7/00   (2006.01)
(52) U.S. Cl. .............. 340/10.34; 365/189.15; 365/189.16; 365/189.09; 365/189.04; 365/101; 340/10.33; 340/10.41; 340/10.51
(58) Field of Classification Search ............ 365/189.01, 365/163
See application file for complete search history.

(56) References Cited

U.S. PATENT DOCUMENTS 5,608,246 A     3/1997  Yeager et al.
5,926,110 A     7/1999  Downs et al.
6,489,883 B1 *  12/2002 Iiyama et al. ............. 340/5.1
6,809,952 B2 *  10/2004 Masui ...................... 365/145
6,820,208 B2 *  11/2004 Hoshino et al. ............ 713/340
7,236,396 B2 *  6/2007  Houston et al. ........ 365/185.07
2006/0067144 A1 * 3/2006 Liu ........................... 365/203
2006/0164212 A1 * 7/2006 Roz et al. ................. 340/10.2
2008/0144349 A1 * 6/2008 Kato et al. ................. 365/103

FOREIGN PATENT DOCUMENTS

JP   2003-036427 A   2/2003
WO   WO 03/105078 A1  12/2003

* cited by examiner

Primary Examiner—Daniel Wu
Assistant Examiner—Pameshanand Mahase
(74) Attorney, Agent, or Firm—IP & T Law Firm PLC

(57) ABSTRACT

A radio frequency identification (RFID) device includes an antenna configured to transmit or receive a radio frequency signal to or from an external communication apparatus; an analog block configured to generate a first power voltage in response to the radio frequency signal; a digital block configured to receive the first power voltage from the analog block, to transmit a response signal to the analog block, and to output a memory control signal; and a memory configured to read/write data in response to the memory control signal, the memory including a high voltage generating unit for generating a second power voltage from the first power voltage, a first portion driven by the second power voltage, and a second portion driven by the first power voltage, wherein the level of the first power voltage is lower than that of the second power voltage.

13 Claims, 8 Drawing Sheets

RFID DEVICE HAVING A NONVOLATILE FERROELECTRIC MEMORY

RELATED APPLICATION

This application is based upon and claims the benefit of priority to Korean Patent Application No. KR 10-2005-0120633, filed on Dec. 9, 2005, the entire contents of which are incorporated herein by reference.

BACKGROUND

1. Technical Field

The present invention generally relates to a Radio Frequency Identification (RFID) device having a nonvolatile ferroelectric memory, and also to a method of supplying a high voltage only to a memory cell array area of a memory in the RFID device and a power voltage to peripheral areas to reduce power consumption.

2. Description of the Related Art

Generally, a ferroelectric random access memory (hereinafter, referred to as 'FeRAM') has attracted considerable attention as next generation memory device because it has a data processing speed as fast as a Dynamic Random Access Memory (hereinafter, referred to as 'DRAM') and conserves data even after the power is turned off.

A FeRAM may have a structure similar to a DRAM but includes capacitors made of a ferroelectric material, which has a high residual polarization characteristic such that data are not deleted even after an electric field is removed.

FIG. 1 is a diagram illustrating a conventional RFID device including a FeRAM.

The conventional RFID includes an antenna 10, an analog block 20, a digital block 30 and a memory 40.

The antenna 10 transmits and receives radio frequency signals to an external reader or from an external writer.

The analog block 20 includes a voltage multiplier 21, a voltage limiter 22, a modulator 23, a demodulator 24, a voltage doubler 25, a power-on reset unit 26 and a clock generating unit 27. The voltage multiplier 21 generates a power voltage VDD for the RFID device in response to the radio frequency signal received from the antenna 10. The voltage limiter 22 limits a voltage of the radio frequency signal received from the antenna 10. The modulator 23 modulates a response signal Response received from the digital block 20 and to be transmitted to the antenna 10. The demodulator 24 detects an operation command signal CMD within the radio frequency signal received from the antenna 10 and outputs the command signal CMD to the digital block 30. The voltage doubler 25 boosts the power voltage VDD provided by the voltage multiplier 21 to a boosted voltage VDD2, which has a swing width twice that of the power voltage VDD, and provides the boosted voltage VDD2 to the memory 40. The power-on reset unit 26 senses the power voltage VDD provided by the voltage multiplier 21 and outputs a power-on reset signal POR to control a reset operation of the digital block 30. The clock generating unit 27 generates a clock signal CLK.

The digital block 30 receives the power voltage VDD, the power-on reset signal POR, the clock signal CLK, and the command signal CMD from the analog block 20, and outputs the response signal Response to the analog block 20. The digital block 30 outputs an address ADD, data I/O, a control signal CTR, and the clock signal CLK to the memory 40.

The memory 40 has a plurality of memory cells each including a nonvolatile ferroelectric capacitor.

In the RFID device, the power source of the antenna is small. However, the RFID device consumes a significant amount of power. As a result, the output voltage VDD of the voltage multiplier 21 is very low.

In the conventional RFID device, the analog block 20 and the digital block 30 can be driven by the low voltage VDD while the memory 40 requires the high voltage VDD2. In addition, the memory 40 has a memory cell array area and a peripheral area. The boosted voltage VDD2 supplied from the voltage doubler 25 of FIG. 1 is required for the memory cell array area, and the peripheral area can be driven by a voltage lower than the boosted voltage VDD2. However, the boosted voltage VDD2 is supplied to all areas of the memory 40, which cause unnecessary power consumption.

SUMMARY

Various embodiments of the present invention are directed at a radio frequency identification (RFID) device in which a high voltage is supplied only to a memory cell array area and a low voltage is supplied to a peripheral area in a memory of a RFID device, thereby minimizing power consumption.

Consistent with the present invention, an RFID device includes an antenna configured to transmit or receive a radio frequency signal to or from an external communication apparatus; an analog block configured to generate a first power voltage in response to the radio frequency signal; a digital block configured to receive the first power voltage from the analog block, to transmit a response signal to the analog block, and to output a memory control signal; and a memory configured to read/write data in response to the memory control signal, the memory including a high voltage generating unit for generating a second power voltage from the first power voltage, a first portion driven by the second power voltage, and a second portion driven by the first power voltage, wherein the level of the first power voltage is lower than that of the second power voltage.

Additional features and advantages of the invention will be set forth in part in the description which follows, and in part will be apparent from that description, or may be learned by practice of the invention. The features and advantages of the invention will be realized and attained by means of the elements and combinations particularly pointed out in the appended claims.

It is to be understood that both the foregoing general description and the following detailed description are exemplary and explanatory and are intended to provide further explanation of the invention as claimed.

BRIEF DESCRIPTION OF THE DRAWINGS

Other aspects and advantages of the present invention will become apparent upon reading the following detailed description and upon reference to the drawings in which.

DETAILED DESCRIPTION

The present invention will be described in detail with reference to the accompanying drawings. Wherever possible, the same reference numbers will be used throughout the drawings to refer to the same or like parts.

Figure 1:
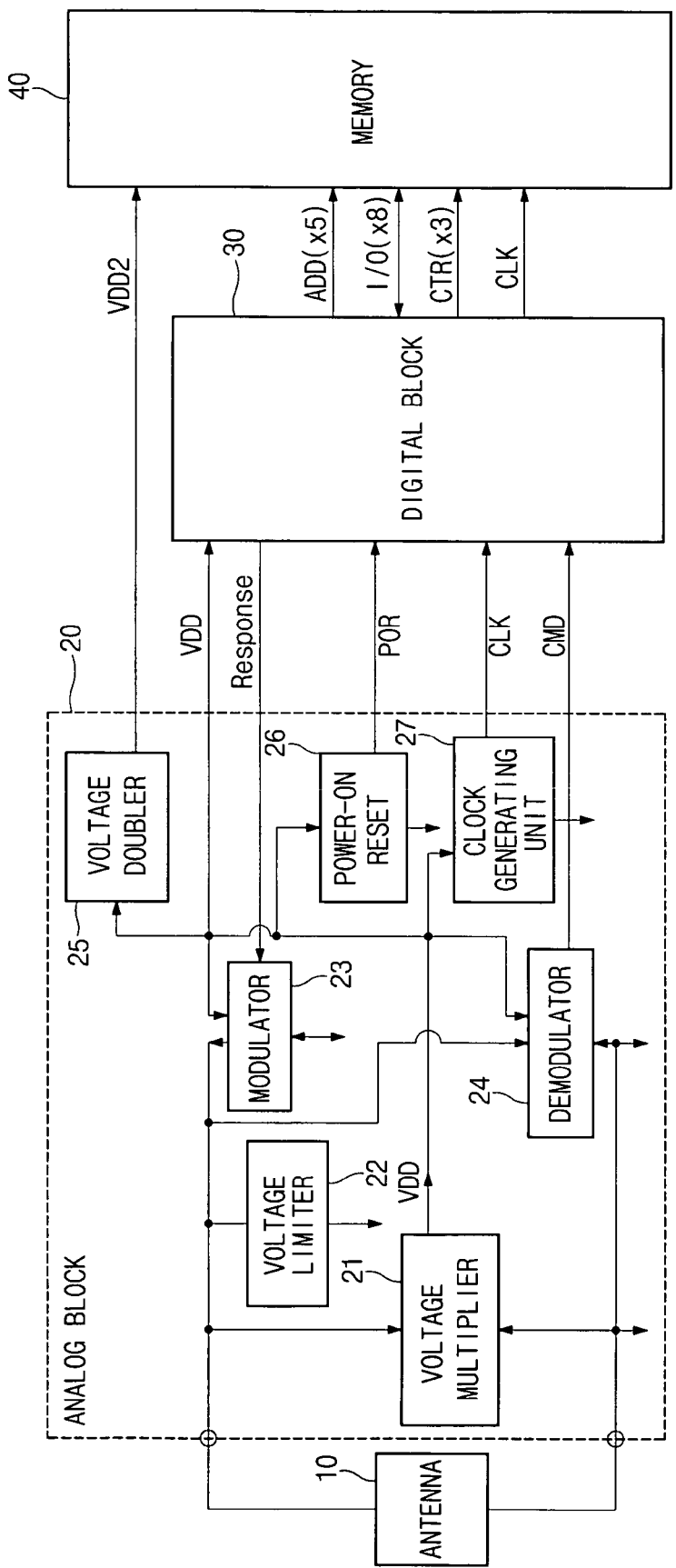
FIG. 1 is a block diagram illustrating a conventional RFID device having a nonvolatile ferroelectric memory device.
Figure 2:
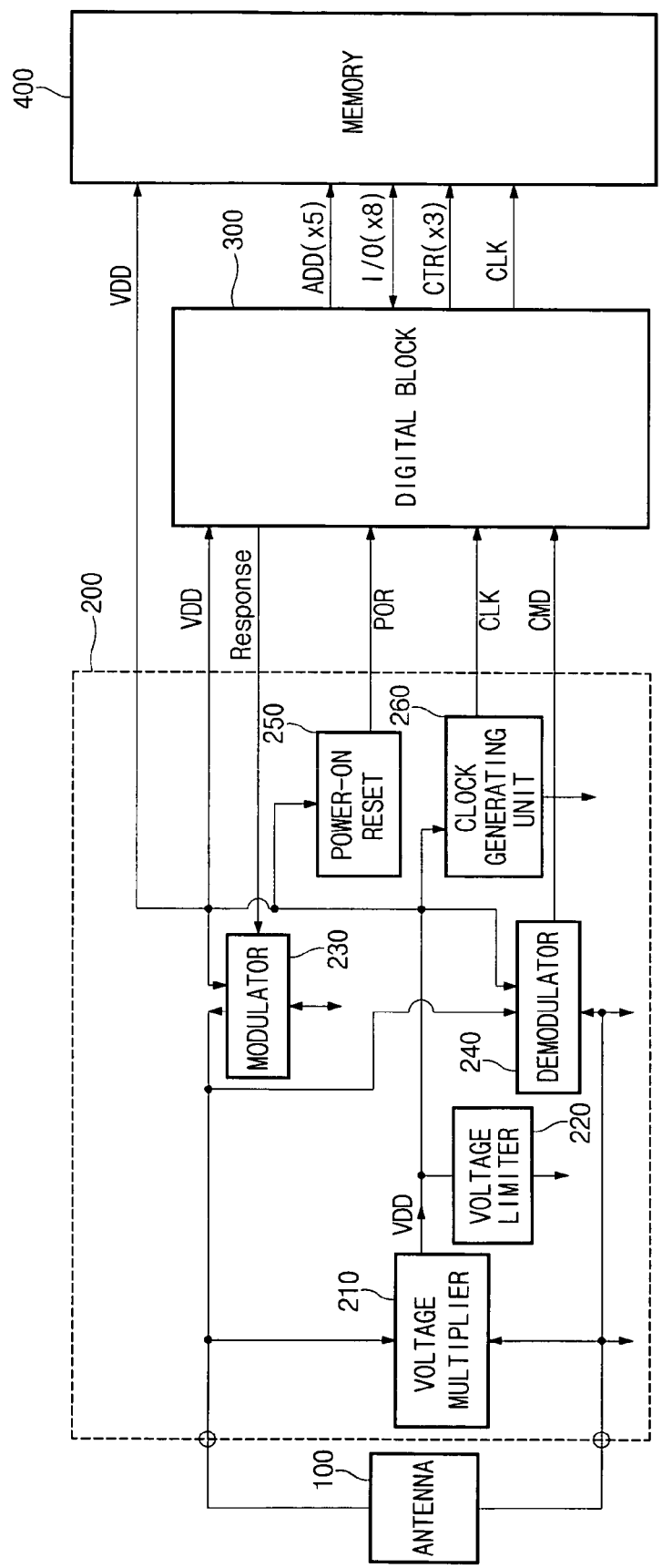
FIG. 2 is a block diagram illustrating a RFID device having a nonvolatile ferroelectric memory device.

FIG. 2 is a block diagram illustrating a RFID device having a nonvolatile ferroelectric memory device.

In this embodiment, the RFID device includes an antenna 100, an analog block 200, a digital block 300 and a memory 400.

The antenna 100 transmits or receives a radio frequency signal to an external reader or from an external writer.

The analog block 200 includes a voltage multiplier 210, a voltage limiter 220, a modulator 230, a demodulator 240, a power-on reset unit 250 and a clock generating unit 260. The voltage multiplier 210 generates a power voltage VDD for the RFID device in response to the radio frequency signal received from the antenna 100. The voltage limiter 220 limits a voltage of the radio frequency signal received from the antenna 100. The modulator 230 modulates a response signal Response received from the digital block 300 and transmits the modulated response signal to the antenna 100. The demodulator 240 is powered by the power voltage VDD, detects an operation command signal from the radio frequency signal received from the antenna 100, and outputs the command signal CMD to the digital block 300. The power-on reset unit 250 senses the power voltage VDD generated by the voltage multiplier 210 and outputs a power-on reset signal POR to the digital block 300 for controlling a reset operation. The clock generating unit 260 is powered by the power voltage VDD to generate a clock signal CLK.

The digital block 300 receives the power voltage VDD, the power-on reset signal POR, the clock signal CLK, and the command signal CMD from the analog block 200, and outputs the response signal Response to the analog block 200. The digital block 300 outputs an address ADD, data I/O, a control signal CTR, and the clock signal CLK to the memory 400.

The memory 400 has a plurality of memory cells each including a nonvolatile ferroelectric capacitor.

Figure 3:
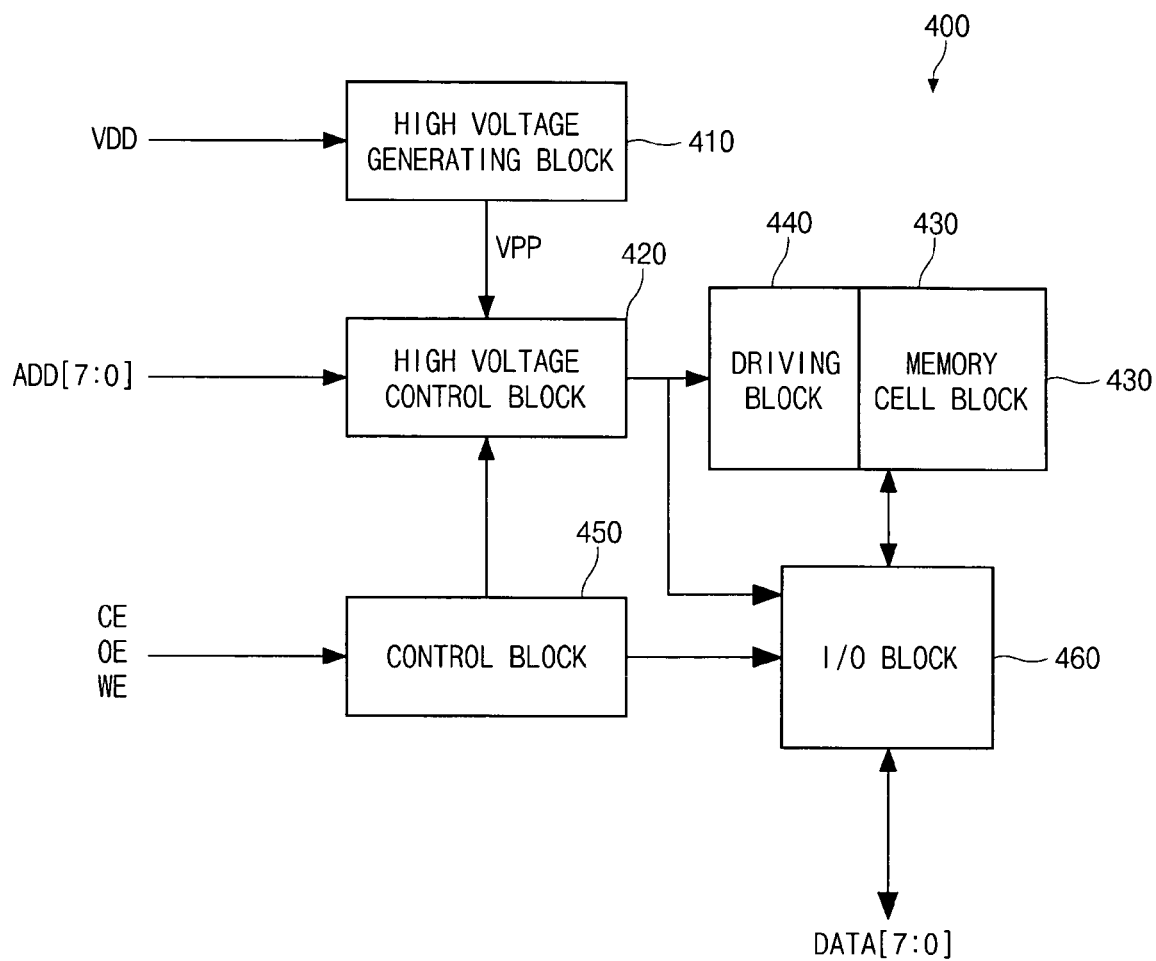
FIG. 3 is a block diagram illustrating a memory in the RFID device of FIG. 2.

FIG. 3 is a block diagram illustrating the memory 400 of FIG. 2.

The memory 400 includes a high voltage generating block 410, a high voltage control block 420, a memory cell block 430, a driving block 440, a control block 450 and an I/O block 460. The high voltage generating block 410 generates a high voltage VPP with the power voltage VDD. The high voltage control block 420 decodes an address ADD<7:0>to select a word line and a plate line of the memory cell block 430. The memory cell block 430 has a plurality of memory cells. The driving block 440 drives the selected word line and the selected plate line. The control block 450 receives a chip enable signal CE, an output enable signal OE, and a write enable signal WE to output a control signal for read/write operations into the high voltage control block 420 and the I/O block 460. The I/O block 460 senses and amplifies data on a selected bit line or transmits externally inputted data into the memory cell block 430.

A high voltage circuit portion of the memory 400 includes the high voltage generating block 410, the high voltage control block 420, the memory cell block 430 and a portion of the I/O block 460, and a low voltage circuit portion includes the control block 450 and the other portion of the I/O block 460.

Figure 4:
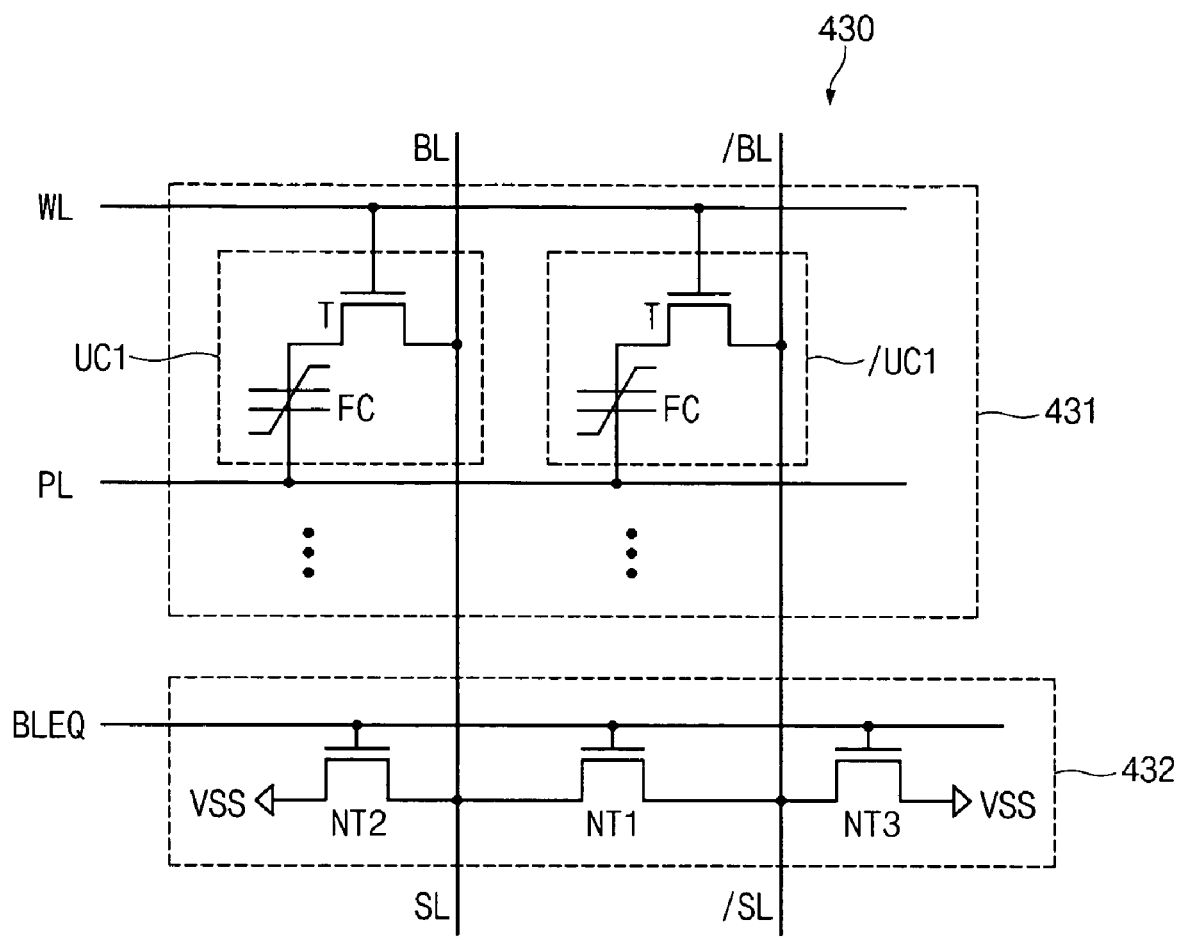
FIG. 4 is a circuit diagram illustrating a memory cell block of the memory of FIG. 3.

FIG. 4 is a circuit diagram illustrating the memory cell block 430 of FIG. 3. The memory cell block 430 includes a memory cell array 431 and a bit line equalizing unit 432.

The memory cell array 431 includes a pair of bit lines BL and /BL, and a plurality of memory cells UC1, /UC1 connected to a plurality of word lines WL and a plurality of plate lines PL. Each of the plurality of memory cells UC1, /UC1 includes a ferroelectric capacitor FC and a transistor T which are respectively connected between the plate line PL and one of the pair of bit lines BL and /BL.

The bit line equalizing unit 432 includes NMOS transistors NT1~NT3. The NMOS transistor NT1, which is connected between the pair of bit lines BL and /BL, equalizes the pair of bit lines BL and /BL when an equalizing signal BLEQ applied to the gates of NMOS transistors NT1~NT3 is high. The NMOS transistors NT2 and NT3 selectively connect the bit lines BL and /BL to a ground voltage VSS when the equalizing signal BLEQ is high.

Figure 5:
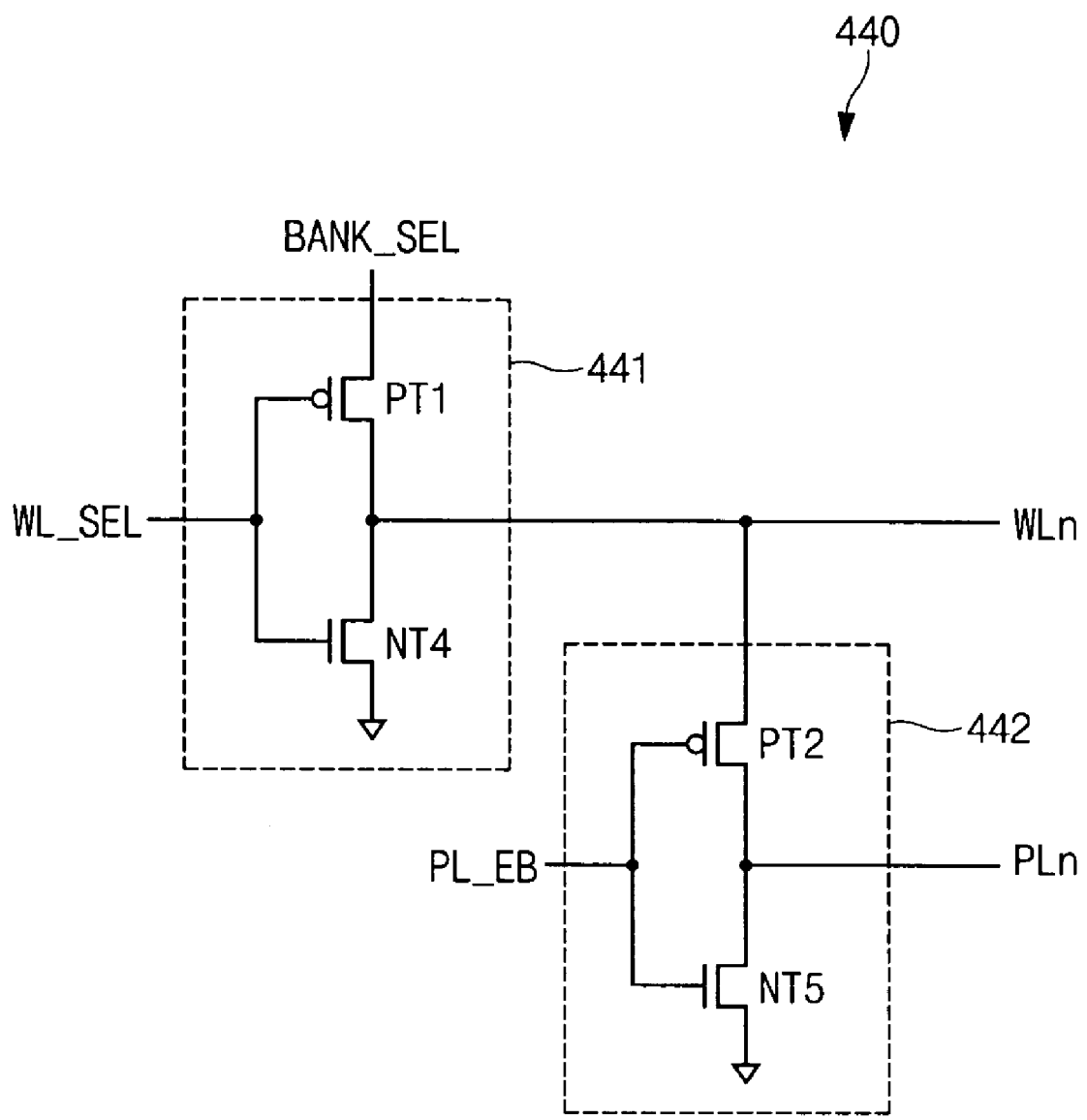
FIG. 5 is a circuit diagram illustrating a driving block of the memory of FIG. 3.

FIG. 5 is a circuit diagram illustrating the driving block 440 of FIG. 3. The driving block 440 includes a word line driving unit 441 and a plate line driving unit 442.

The word line driving unit 441 includes a PMOS transistor PT1 connected serially to a NMOS transistor NT4. The PMOS transistor PT1 receives a bank selecting signal BANK_SEL from the high voltage control block 420 and outputs the bank selecting signal BANK_SEL on a word line WLn when a word line selecting signal WL_SEL applied by the high voltage control block 420 to the gates of the PMOS transistor PT1 and the NMOS transistor NT4 is low. The NMOS transistor NT4 connects the word line WLn to a ground when the word line selecting signal WL_SEL is high.

The plate line driving unit 442 includes a PMOS transistor PT2 connected serially to a NMOS transistor NT5. The PMOS transistor PT2 connects a plate line PLn to the word line WLn when a plate line selecting signal PL_EB applied by the high voltage control block 420 to the gates of the PMOT transistor PT2 and the NMOS transistor NT5 is low. The NMOS transistor NT5 connects the plate line PLn to a ground when the plate line selecting signal PL_EB is high.

Figure 6:
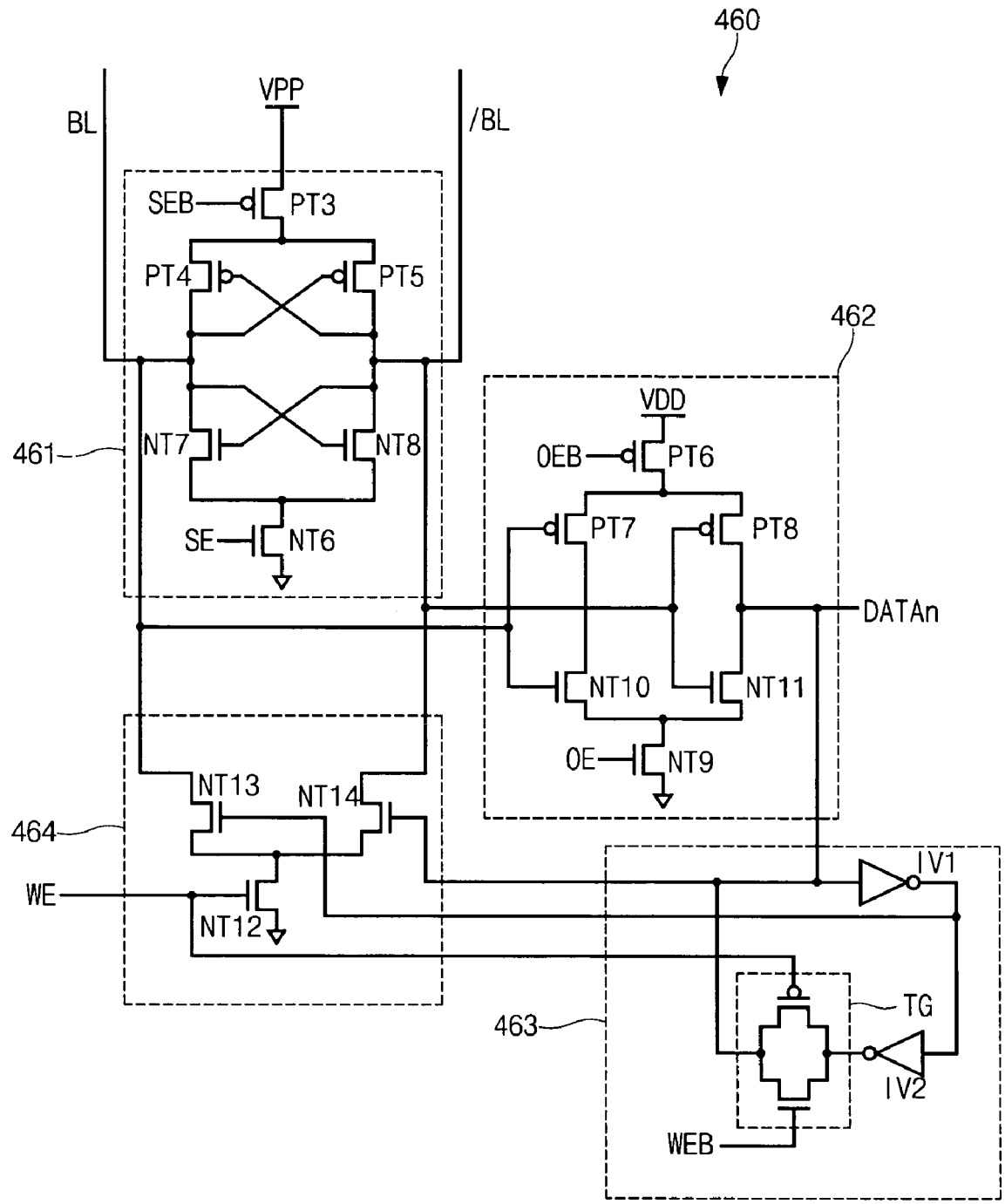
FIG. 6 is a circuit diagram illustrating an I/O block of the memory of FIG. 3.

FIG. 6 is a circuit diagram illustrating the I/O block 460 of FIG. 3.

The I/O block 460 includes a sense amplifier 461, a data output unit 462, a data latch unit 463 and a data input unit 464.

The sense amplifier 461 senses and amplifies data on the pair of bit lines BL and /BL. The sense amplifier 461 includes PMOS transistors PT3~PT5, and NMOS transistors NT6~NT8. The cross-coupled PMOS transistors PT4 and PT5 pulls up data on the pair of bit lines BL and /BL, and the cross-coupled NMOS transistors NT7 and NT8 pulls down data on the pair of bit lines BL and /BL. The PMOS transistor PT3 receives a high voltage VPP through high voltage control block 420 and applies the high voltage VPP to a common source of the PMOS transistors PT4 and PT5 when a sense amplifier enable signal SEB applied by the control block 450 to the gate of the PMOS transistor PT6 is low. The NMOS transistor NT6 connects a common source of the NMOS transistors NT7 and NT8 to a ground when a sense amplifier enable signal SE applied by the control block 450 to the gate of the NMOS transistor NT6 is high.

The data output unit 462 outputs the data on the pair of bit liens BL and /BL sensed and amplified by the sense amplifier 461, as data DATAn into an I/O terminal (not shown). The data output unit 462 includes PMOS transistors PT6~PT8, and NMOS transistors NT9~NT11. The PMOS transistor PT7 and the NMOS transistor NT10, and the PMOS transistor PT8 and the NMOS transistor NT11 respectively form an inverter which drives the data amplified by the sense amplifier 461 to output the data DATAn. The PMOS transistor PT6 receives the power voltage VDD and applies the power voltage VDD to a common source of the PMOS transistors PT7 and PT8 when an output enable signal OEB applied to the gate of the PMOS transistor PT6 is low, and the NMOS transistor NT9 connects a common source of the NMOS transistors NT10 and NT11 to a ground when an output enable signal OE applied to the gate of the NMOS transistor NT9 is high.

The data latch unit 463 latches data outputted into the I/O terminal by the data output unit 462, or drives data inputted through the I/O terminal into the data input unit 464. The data latch unit 463 includes inverters IV1 and IV2, and a transmission gate TG. The inverters IV1 and IV2 sequentially invert the data DATAn inputted or outputted through the I/O terminal. The transmission gate TG selectively connects an output terminal of the inverter IV2 to the I/O terminal, that is, an input terminal of the inverter IV1 in response to write enable signals WE and WEB. Here, the transmission gate TG is turned off in a write operation, and turned on in a read operation, thereby latching a level of the outputted data DATAn.

The data input unit 464 selectively transmits data driven by the data latch unit 463 onto the pair of bit lines BL and /BL. The data input unit 464 includes NMOS transistors NT12~NT14. The NMOS transistor NT12 selectively connects a common source of the NMOS transistors NT13 and NT14 to a ground in response to the write enable signal WE. The gates of NMOS transistors NT14 and NT13 respectively receive the data DATAn inputted through the I/O terminal and an output signal of the inverter IV1 of the data latch unit 463. As a result, one of the pair of bit lines BL and /BL is connected to a ground through the NMOS transistor NT12.

Figure 7:
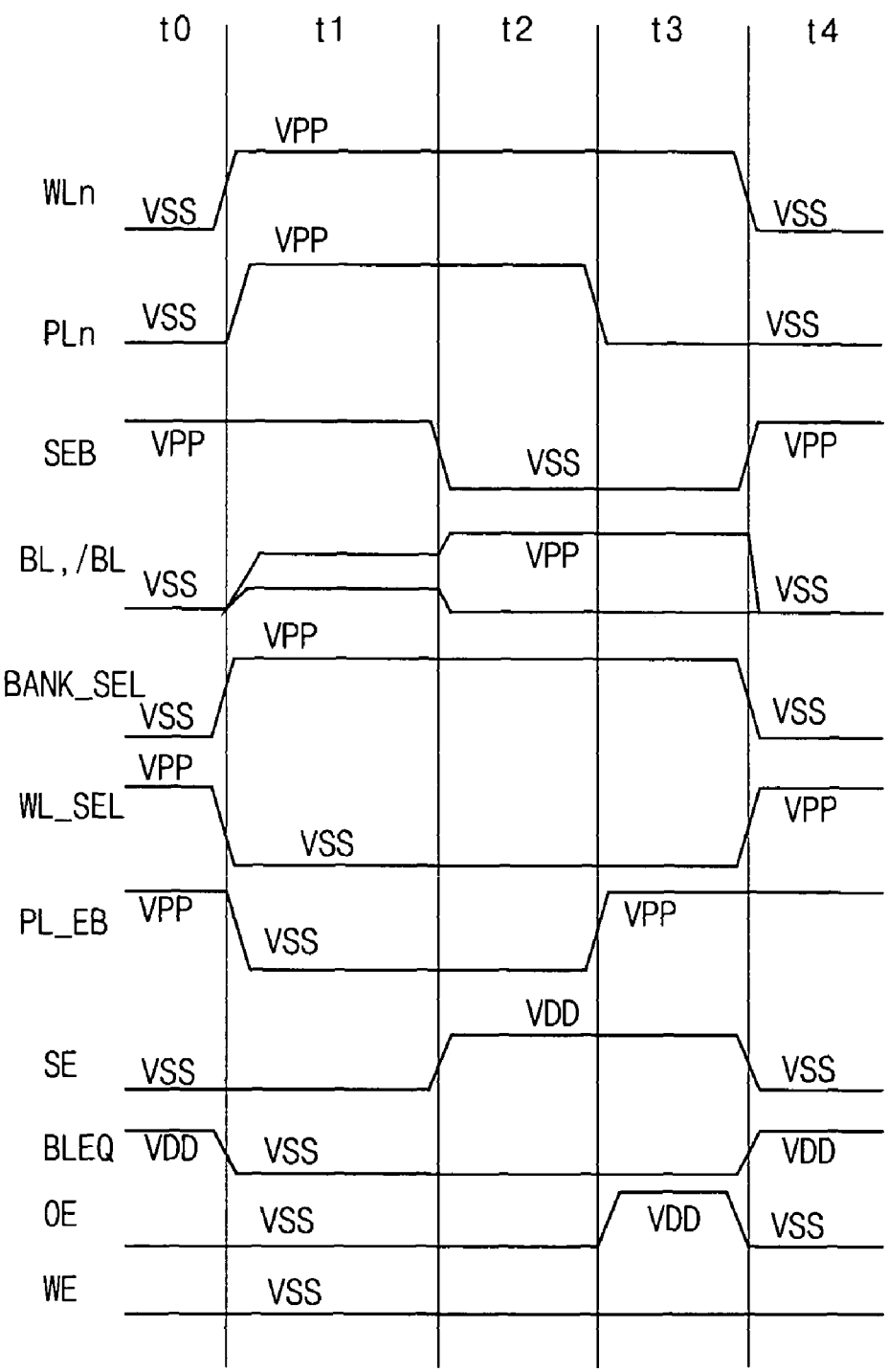
FIG. 7 is a timing diagram illustrating a read operation of the memory of FIG. 3.

FIG. 7 is a timing diagram illustrating the read operation of the memory 400 of FIG. 3.

In a period t0, the bit line equalizing signal BLEQ is activated to a power voltage level VDD to precharge the pair of bit lines BL and /BL to a ground level VSS. The word line selecting signal WL_SEL and the plate line selecting signal become at a high voltage level VPP to precharge the word line WLn and the plate line PLn to the ground voltage VSS.

In a period t1, the bank selecting signal BANK_SEL transits to the high voltage level VPP, and the word line selecting signal WL_SEL and the plate line selecting signal PL_EB transit to the ground level VSS, so that the word line WLn and the plate line PLn transit to the high voltage level VPP. As a result, data stored in the selected memory cell UC1 and /UC1 are transmitted into the bit lines BL and /BL by charge distribution.

In a period t2, the sense amplifier enable signal SE transits from the ground level VSS to the power voltage level VDD, and the sense amplifier enable signal SEB transits from the high voltage level VPP to the ground level VSS, so that the sense amplifier 461 senses and amplifies data on the pair of bit lines BL and /BL. In the mean time, all of low level data "0" in the memory cells UC1 and /UC1 are refreshed.

In a period t3, the output enable signal OE transits to the power voltage level VDD so that the data output unit 462 outputs the data DATAn amplified by the sense amplifier 461 through the I/O terminal. At the same time, the plate line selecting signal PL_EB transits to the high voltage level VPP and the plate line PLn becomes at the ground voltage VSS. Therefore, all of high level data "1" restored in the memory cells are refreshed.

In a period t4, the word line selecting signal WL_SEL and the sense amplifier enable signal SEB become at the high voltage level VPP, and the bit line equalizing signal BLEQ becomes at the power voltage level VDD. The bank selecting signal BANK_SEL, the sense amplifier enable signal SE and the output enable signal OE transit to the ground level VSS so that the word line WLn and the pair of bit lines BL and /BL become at the ground level VSS.

Figure 8:
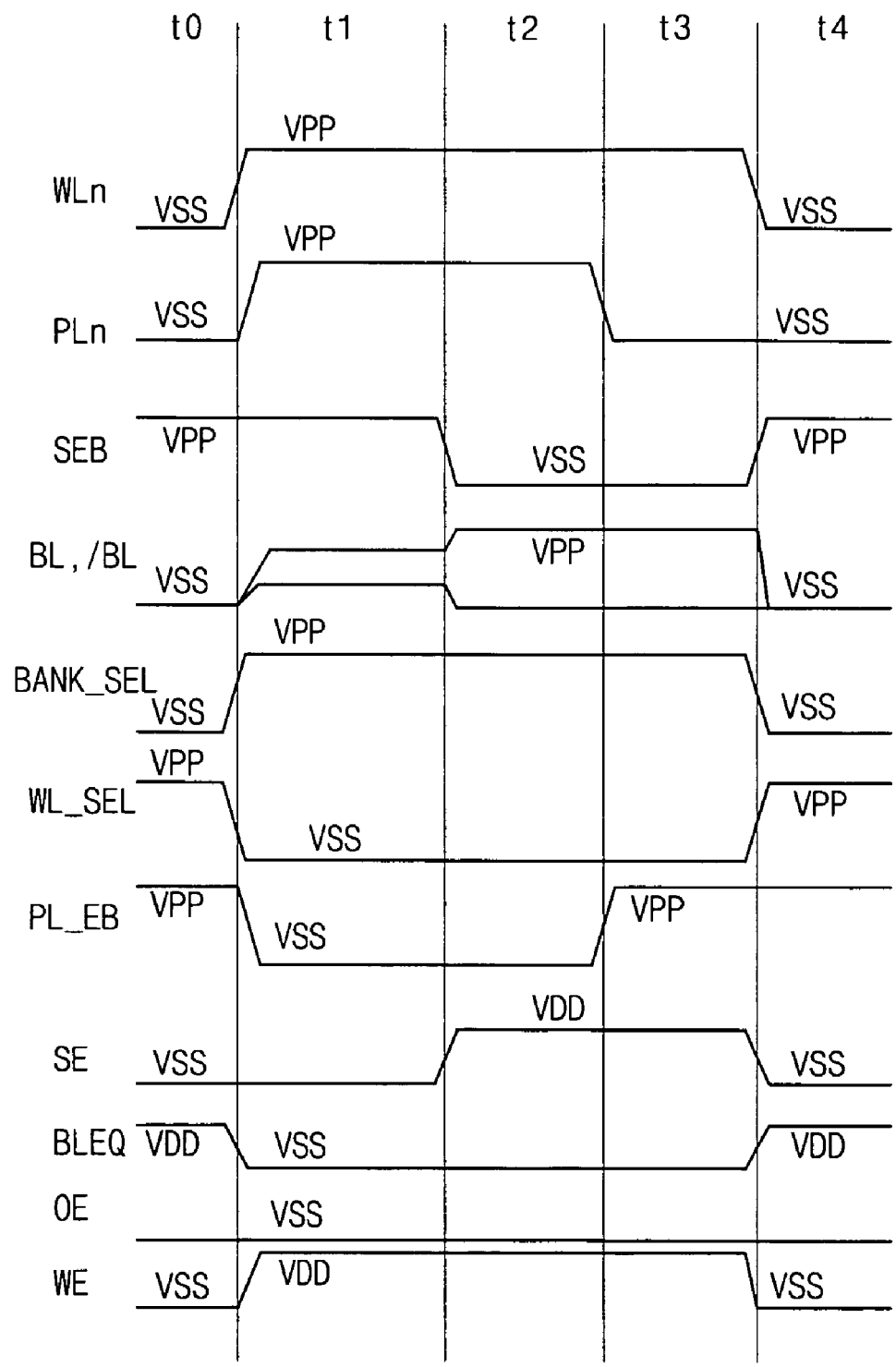
FIG. 8 is a timing diagram illustrating a write operation of the memory of FIG. 3.

FIG. 8 is a timing diagram illustrating the write operation of the memory 400 of FIG. 3.

In a period t0, the bit line equalizing signal BLEQ is activated to the power voltage level VDD to precharge the pair of bit lines BL and /BL to the ground level VSS. The word line selecting signal WL_SEL and the plate line selecting signal PL_EB become at a high voltage level VPP to precharge the word line WLn and the plate line PLn to the ground voltage VSS.

In a period t1, the bank selecting signal BANK_SEL transits to the high voltage level VPP, and the word line selecting signal WL_SEL and the plate line selecting signal PL_EB transit to the ground level VSS, so that the word line WLn and the plate line PLn transit to the high voltage level. At the same time, the write enable signal WE transits to the power voltage level VDD so that the data input unit 464 transmits the data DATAn inputted through the I/O terminal onto the pair of bit lines BL and /BL.

In a period t2, the sense amplifier enable signal SE transits from the ground level VSS to the power voltage level VDD, and the sense amplifier enable signal SEB transits from the high voltage level VPP to the ground level VSS so that the sense amplifier 461 senses and amplifies data on the pair of bit lines BL and /BL. Here, all of low level data "0" are written in the memory cells UC1 and /UC1.

In a period t3, when the plate line selecting signal PL_EB transits to the high voltage level VPP and the plate line PLn becomes at the ground voltage VSS, all of high level data "1" inputted through the I/O terminal are written in the selected memory cells.

In a period t4, the word line selecting signal WL_SEL and the sense amplifier enable signal SEB become at the high voltage level VPP, and the bit line equalizing signal BLEQ becomes at the power voltage level VDD. The bank selecting signal BANK_SEL, the sense amplifier enable signal SE and the output enable signal OE transit to the ground level VSS so that the word line WLn and the pair of bit lines BL and /BL become at the ground level VSS.

As described above, a high voltage VPP is supplied only to a cell array area and a low voltage VDD is applied to a peripheral area in a nonvolatile ferroelectric memory of a RFID consistent an embodiment of the present invention, thereby minimizing power consumption of the nonvolatile ferroelectric memory.

The foregoing description of various embodiments of the invention has been presented for purposes of illustration and description. It is not intended to be exhaustive or to limit the invention to the precise form disclosed, and modifications and variations are possible in light of the above teachings or may be acquired from practice of the invention. Thus, the embodiments were chosen and described in order to explain the principles of the invention and its practical application to enable one skilled in the art to utilize the invention in various embodiments and with various modifications as are suited to the particular use contemplated.

What is claimed is:

1. A radio frequency identification (RFID) device comprising:
   an antenna configured to transmit or receive a radio frequency signal to or from an external communication apparatus;

an analog block configured to generate a first power voltage in response to the radio frequency signal;

a digital block configured to receive the first power voltage from the analog block, to transmit a response signal to the analog block, and to output a memory control signal; and a memory configured to read/write data in response to the memory control signal, the memory including a high voltage generating block for generating a second power voltage from the first power voltage, a memory cell array driven by the second power voltage, and a peripheral area driven by the first power voltage, wherein the level of the first power voltage is lower than that of the second power voltage, wherein the memory comprises a high voltage control block powered by the second power voltage and configured to decode an address;

a memory cell block configured to read/write data depending on control of the high voltage control block;

a control block configured to control the high voltage control block and the memory cell block in response to the memory control signal; and an input/output (I/O) block configured to output data stored in the memory cell block or store externally inputted data in the memory cell block.

2. The RFID device according to claim 1, wherein the memory cell block comprises:

a driving unit configured to drive a plurality of word lines and a plurality of plate lines in response to an output signal from the high voltage control block;

the memory cell array including a plurality of nonvolatile memory cells, each configured to store data and output the stored data and connected to a word line, a bit line, and a plate line; and an equalizing unit configured to equalize the bit line.

3. The RFID device according to claim 2, wherein the driving unit driven by the second power voltage, and the equalizing unit driven by the first power voltage.

4. The RFID device according to claim 2, wherein the driving unit comprises:

a word line driving unit configured to drive a selected word line in response to a word line selecting signal from the high voltage control block; and a plate line driving unit configured to drive a selected plate line in response to a plate line selecting signal from the high voltage control block.

5. The RFID device according to claim 4, wherein the word line driving unit comprises:

a pull-up unit configured to pull up the selected word line to a high voltage level with a bank selecting signal from the high voltage control block when the word line selecting signal has a first value; and a pull-down unit configured to selectively connect and pull down the selected word line to ground when the word line selecting signal has a second value.

6. The RFID device according to claim 4, wherein the plate line driving unit comprises:

a pull-up unit configured to selectively connect and pull up the selected plate line to the selected word line when the plate line selecting signal has a first value; and a pull-down unit configured to selectively connect and pull down the selected plate line to ground when the plate line selecting signal has a second value.

7. The RFID device according to claim 2, wherein the nonvolatile memory cell comprises:

a ferroelectric capacitor having one terminal connected to the corresponding plate line; and a switch unit configured to selectively connect the corresponding bit line to the other terminal of the ferroelectric capacitor depending on the signal on the corresponding word line.

8. The RFID device according to claim 1, wherein the I/O block comprises:

a sense amplifier configured to sense and amplify data on a plurality of bit lines;

a data output unit configured to output data amplified by the sense amplifier into an I/O terminal;

a data latch unit configured to latch data outputted into the I/O terminal by the data output unit or drive data inputted through the I/O terminal; and a data input unit configured to selectively transmit data driven by the data latch unit onto the bit lines.

9. The RFID device according to claim 8, wherein the sense amplifier comprises:

an enable unit configured to apply a high voltage in response to a sense amplifier enable signal from the high voltage control block;

a pull-up latch unit configured to pull up data on the bit lines to the high voltage; and a pull-down latch unit configured to pull down data on the bit lines to ground level.

10. The RFID device according to claim 9, wherein the pull-up latch unit comprises a first PMOS transistor cross-coupled with a second PMOS transistor.

11. The RFID device according to claim 9, wherein the pull-down latch unit comprises a first NMOS transistor cross-coupled with a second NMOS transistor.

12. The RFID device according to claim 1, wherein the analog block comprises:

a voltage multiplier configured to generate the first power voltage in response to the radio frequency signal;

a voltage limiter configured to limit the first power voltage;

a modulator configured to modulate a response signal received from the digital block and to transmit the modulated response signal to the antenna;

a demodulator powered by the first power voltage generated by the voltage multiplier and limited by the voltage limiter, the demodulator being configured to detect an operation command signal from the radio frequency signal and output the operation command signal to the digital block;

a power-on reset unit configured to detect the first power voltage and control a reset operation of the digital block; and a clock generating unit powered by the first power voltage and configured to generate a clock signal.

13. The RFID according to claim 12, wherein the voltage multiplier applies the first power voltage to the memory.

* * * * *